United States Patent [19]

Maas, Jr.

[11] 4,117,084

[45] Sep. 26, 1978

[54] PROCESS FOR PRODUCING $UO_2F_2$

[75] Inventor: Edward T. Maas, Jr., Kendall Park, N.J.

[73] Assignee: Exxon Research & Engineering Co., Linden, N.J.

[21] Appl. No.: 752,736

[22] Filed: Dec. 21, 1976

[51] Int. Cl.² .................. C01G 43/02; C01G 43/06
[52] U.S. Cl. ........................ 423/253; 252/301.1 R; 260/429.1; 423/11
[58] Field of Search ............... 252/301.1 R; 423/253, 423/258, 11; 260/429.1

[56] References Cited

PUBLICATIONS

Chakrauorti, M. C. et al., "Fluoro complexes of Hexavalent Uranium -IV" J. Inorg. Nucl. Chem. 34(9) 2867-2874.

Chem. Abs. 82: 132476N, 1975.

Dewan, J. C. et al., "Fluoride Crystal Structures", J Chem. Society, Dalton, 1975, Issue 21E, pp. 2171-2174

Primary Examiner—Richard E. Schafer
Attorney, Agent, or Firm—R. D. Hantman; R. E. Nanfeldt

[57] ABSTRACT

A process for producing $UO_2F_2$ from a soluble uranyl salt. The uranyl salt is combined with a soluble fluoride salt in a solvent to form a reaction solution. The solvent exhibits Lewis base characteristics. The reaction product is a crystalline solid which is separated from the reaction solution. The $UO_2F_2$ may then be obtained from the crystalline solid.

29 Claims, No Drawings

PROCESS FOR PRODUCING UO$_2$F$_2$

BACKGROUND OF THE INVENTION

UO$_2$F$_2$ is a material which can be employed in the production of UF$_6$ which is then subsequently used for isotope enrichment utilizing presently gaseous diffusion and/or gaseous centrifugation techniques. For example, UO$_2$F$_2$ can be converted to UF$_6$ in the following ways:

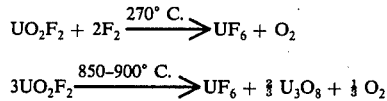

UO$_2$F$_2$ has been made in the prior art by a number of methods. These methods include:

1. Hydrolysis of UF$_6$ with water or steam UF$_6$ + 2H$_2$O → UO$_2$F$_2$ + 4HF
2. Reaction of UO$_3$ + 2HF(gas) → UO$_2$F$_2$ + H$_2$O (T = 350°–500° C.)
3. UO$_3$ + 2F$_2$ → UO$_2$F$_2$ + other products (T=350° C)
4. UO$_2$ + F$_2$ → UO$_2$F$_2$ (T=350° C.)
5. UF$_4$ + O$_2$ → UF$_6$ + UO$_2$F$_2$ (T=800° C.)
6. UO$_3$ or UO$_4$.2H$_2$O + HF(aqueous) → UO$_2$F$_2$ (solutions)

A description of all of the above methods can be found in the book by Joseph J. Katz and Eugene Rabinowitch. *The Chemistry of Uranium,* Dover Publications, Inc., New York, N.Y., 1951, p. 564 ff. As pointed out in the text, each of the methods include problems and difficulties as discussed below.

Reaction 1, although it is spontaneous even at ambient temperatures, is not a desired reaction during production of UF$_6$. Reaction 2-5, because of the use of elemental fluorine and/or elevated temperatures, must be carried out in very specialized apparatus to prevent contamination of the product and to contain the reaction from the surrounding environs. Likewise many of these reactions are kinetically slow at the temperatures listed and even higher temperatures are necessary to obtain reasonable quantities of product. The difficulties with method 6 are described by the following excerpt from Katz and Rabinowitch (referenced above):

"Uranyl fluoride is difficult to crystallize, very viscous syrups being formed on concentration. Even if uranyl fluoride dihydrate crystals can be induced to form, separation of the crystals from the mother liquor is usually very difficult. The crystals of uranyl fluoride dihydrate are soft thin plates, pale yellow, and so hygroscopic that it is difficult to dry them."

It would appear from the above descriptions that a low temperature, non-corrosive scheme to prepare UO$_2$F$_2$ would be desirable. Also another desirable feature would be that the product should be easy to recover from the reaction media in a form that is easy to handle for subsequent manipulations and utilizations.

SUMMARY OF THE INVENTION

The present invention is a process for producing UO$_2$F$_2$ from a soluble uranyl salt. The salt is added to a solvent which exhibits Lewis base characteristics. A soluble fluoride salt is also added to the solvent to form a reaction solution so that the uranyl salt and the fluoride salt react to produce a crystalline solid. The solid is separated from the reaction solution.

The UO$_2$F$_2$ may then be obtained by separating it from the crystalline solid by means of thermal treatment under oxidizing, inert, or reducing conditions or vacuum.

DESCRIPTION OF THE PREFERRED EMBODIMENT

The present invention includes the solution reaction of a soluble uranyl salt (uranyl = UO$_2^{2+}$) with a soluble fluoride salt in a solvent which exhibits Lewis base characteristics.

The uranyl salt is added to the solvent in an amount to produce a solution with the concentration of uranium within the range 0.005 moles U/liter and 0.50 moles U/liter.

A separate solution of the fluoride salt is made up in the same solvent within a concentration range of 0.01 moles F/liter and 1.0 moles F/liter.

The two solutions are then mixed to effect reaction. Preferably the uranium concentration is in the range of 0.02 moles U/liter and 0.42 moles U/liter. The preferable fluoride concentrations are in the range 0.04 moles F/liter and 0.84 moles F/liter. The fluoride concentration must be maintained at a level as to produce a F/U ratio in the final solution of about 2.00 in order to affect quantitative precipitation of the uranium and in order to protect the integrity and identity of the product.

Preferred uranyl salts are uranyl acetate (and its dihydrate) and uranyl nitrate (and its hexahydrate). A preferred fluoride salt is ammonium fluoride (NH$_4$F).

Water may be contained in the solution up to the equivalent of 10 moles H$_2$O/mole U and preferably a maximum of 6 moles H$_2$O/mole U. This water may be present in the solvent or may be added because of the hydrated nature of many soluble uranyl salts and/or fluoride salts.

The temperature of the reaction solution is maintained between about −10° and about 125° C. and preferably between 80° and 110° C. for a period of time between 0.5 hr. and 5.0 hr.

The uranyl salt and the fluoride salt react to form a crystalline solid, UO$_2$F$_2$.(x) base, see copending applications Ser. No. 752,722 and Ser. No. 752,734 assigned to the same assignee as the present invention, which are incorporated herein by reference.

UO$_2$F$_2$ can be obtained from these intermediate products by thermal means. A heating to, at most, 340° C. under inert, oxidizing or reducing atmospheres or vacuum will produce UO$_2$F$_2$ as a final product. The organic Lewis base released from the intermediate by the thermal treatment can be recovered for reuse. Table II lists temperatures for the recovery of UO$_2$F$_2$ for various intermediate products.

The organic Lewis bases that form the compositions of the present invention include generalized classes of nitrogen, sulfur and oxygen containing bases. All of these classes are defined below.

It is to be appreciated that commercial grades of the Lewis bases useful in this invention may contain water. While it is preferable that no water be present, the invention contemplates the use of such bases containing up to about 5% water.

Suitable Lewis bases for the present invention include the following listed below, and mixtures thereof:

1. Amines of generalized formula

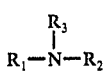

where at least one of radicals $R_1$, $R_2$ and $R_3$ is an aliphatic or an aromatic carbon network with carbon numbers of 1 to 6 with the remaining radicals, if any, being H.

2. Aliphatic heterocyclic amines of generalized formula:

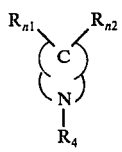

where $R_4$ is H or an aliphatic radical of carbon number of 1 to 4 and n can assume values of 4 to 6 inclusive and $R_{n1}$ and $R_{n2}$ are each individually H or methyl; each of $R_{n1}$ and $R_{n2}$ being the same or different.

For example, when $n = 4$, then the compound would be

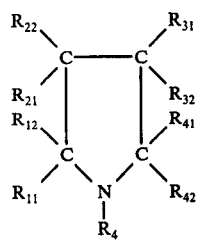

and when $n = 6$, the compound would be

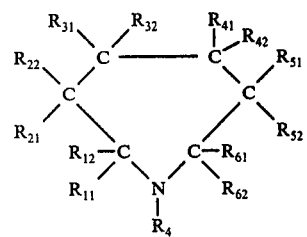

3. Aromatic heterocyclic amines of generalized formula

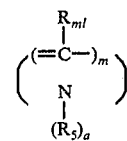

where $m$ is an integer of 4 to 6 inclusive and $a = 1$ when $m = 4$ or 6 and $a = 0$ when $m = 5$, and $R_5$ is H or aliphatic radical of carbon number 1 to 4 and $R_{m1}$ is H or methyl.

For example when $m=5$, the compound would be

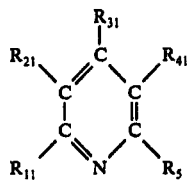

4. Aliphatic amides of formic acid of generalized formula

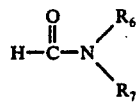

where $R_6$ and $R_7$ are each individually H or an aliphatic radical of carbon number 1 to 3, each of $R_6$ and $R_7$ being the same or different.

An example of this type of compound

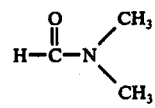

5. Alcohols of generalized formula

where $R_8$ is an aliphatic radical of carbon number 3 or 4.

An example of this type of compound is

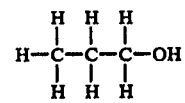

6. Sulfides of generalized formula

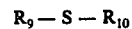

where $R_9$ and $R_{10}$ are the same or different aliphatic radicals having a carbon number of 1 to 3.

An example of this type of compound is

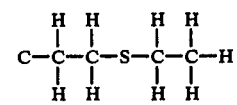

7. Aliphatic heterocyclic sulfides of generalized formula

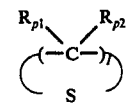

where $p$ is an integer between 4 and 6 inclusive and $R_{p1}$ and $R_{p2}$ are each individually H or methyl, each of $R_{p1}$ and $R_{p2}$ being the same or different.

An example of this type of compound is

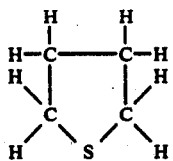

8. Sulfoxides of generalized formula

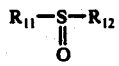

where $R_{11}$ and $R_{12}$ are aliphatic radicals of carbon number 1 to 3. An example of this type of compound is

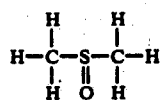

9. Aliphatic heterocyclic sulfoxides of generalized formula

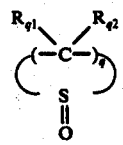

where $q$ is an integer of 4 to 6 inclusive and $R_{q1}$ and $R_{q2}$ are each individually H or methyl, each of $R_{q1}$ and $R_{q2}$ being the same or different.

An example of this type of compound is

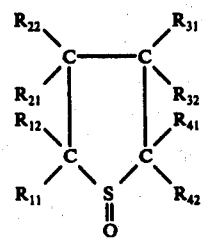

10. Sulfones of generalized formula

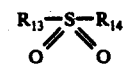

where $R_{13}$ and $R_{14}$ are aliphatic radicals of carbon 1 to 3.

An example of this type of compound is

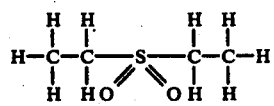

11. Aliphatic heterocyclic sulfones of generalized formula

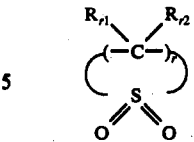

where $r$ is an integer of 4 to 6 inclusive and $R_{r1}$ and $R_{r2}$ are each individually H or methyl, each of $R_{r1}$ and $R_{r2}$ being the same or different.

An example of this type of compound is

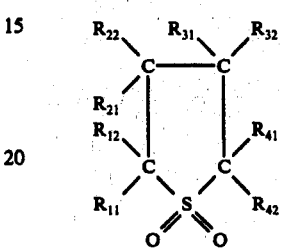

Table 1 includes specific examples of Lewis base suitable for the present invention.

Preferred members of the list include aniline, pyridine, 2-picoline, 4-picoline, N,N-dimethyl formamide n-propylalcohol because the absence of sulfur cause less contamination in the process of the present invention.

More preferable are pyridine, 2-picoline, 4-picoline because of more favorable reactivity in the presence of water.

| Base Formula | Structure |
| --- | --- |
| Pyridine | |
| 2-picoline, $C_5H_4(CH_3)N$ | |
| 4-picoline, $C_5H_4(CH_3)N$ | |
| Dimethylsulfoxide $(CH_3)_2SO$ | |
| N,N-dimethylformamide $HCON(CH_3)_2$ | |
| Tetrahydrothiophene $(CH_2)_4S$ | |

-continued

| Base Formula | Structure |
|---|---|
| Tetramethylenesulfoxide (CH₃)₄SO | (structure) |
| Tetramethylenesulfone (CH₃)₄SO₂ | (structure) |
| n-propylalcohol C₃H₇OH | CH₃CH₂CH₂OH |
| Aniline | (structure) |

TABLE II

Temperatures for the Recovery of $UO_2F_2$

| Base (B/$UO_2F_2$) | T (peak) |
|---|---|
| py (0.7) | 210° C. |
| py (1.65) | 110° C. |
| 4-picoline (1.86) | 130° C. |
| 2-picoline (0.67) | 225° C. |
| DMF (1.0) | 220° C. |
| DMSO (1.0) | 340° C. |
| THF (0.76) | 300° C. |
| THTO (1.5) | 90/300° C. |
| THTO₂ (1.0) | 130° C. |
| n-prOH (0.95) | 110° C. |

EXAMPLE 1

Uranyl acetate ($UO_2(CH_3COO)_2 \cdot 2H_2O$) [4.24 g.; 0.01 moles] or uranyl nitrate ($UO_2(NO_3)_2 \cdot 6H_2O$ [5.02 g.; 0.01 moles] is dissolved in 25 cc of pyridine. Ammonium Fluoride [0.74 g; 0.02 moles] is dissolved in a separate 25 cc of pyridine. These solutions are made up at room temperature but may be heated up to reflux (pyridine: boiling point = 115° C.) to hasten dissolution of the solids. The two solutions are then mixed together. The temperature can be maintained at from 20° to 115° C. The reaction mixture, containing the solid product which was formed immediately upon mixing is then, preferably, heated under reflux conditions for ca. 30 min. to aid in crystallite formation. The resulting product, nominally formulated $UO_2F_2 \cdot (0.7)$ py·(0.7) $H_2O$, is then filtered off using standard laboratory techniques, washed with approximately 25 cc of fresh pyridine and then air dried. The resulting dry solid is then placed in a ceramic boat in a furnace in an air atmosphere at atmospheric pressure and heated to 240° C. to insure complete removal of the incorporated pyridine and water and to yield the desired product $UO_2F_2$[3.08 g, 0.01 moles] in essentially quantitative yield.

What is claimed is:
1. A process for producing $UO_2F_2$ comprising:
   (a) adding a soluble uranyl salt to an organic solvent which exhibits Lewis Base characteristics said uranyl salt being selected from the group consisting of uranyl acetate and uranyl nitrate;
   (b) adding a soluble fluoride salt to said solvent to form a reaction solution so that said uranyl salt and said fluoride salt react to produce a crystalline solid having the structure $UO_2F_2 \cdot (X)$ base;
   (c) separating said crystalline solid from said reaction solution; and
   (d) heating said $UO_2F_2 \cdot (X)$ base to a sufficient temperature to produce said $UO_2F_2$.
2. The process of claim 1 in which said fluoride salt is ammonium fluoride.
3. The process of claim 1 in which said uranyl salt and fluoride salt are present in said solution in amounts such that the ratio of fluoride to uranium in said solution is about 2:1.
4. The process of claim 1 in which uranium from said uranyl salt is present in said solvent in an amount within the range 0.005 moles U/liter and 0.50 moles U/liter.
5. The process of claim 1 in which said reaction solution is maintained within the range of about −10° and about 125° for a period of time between 0.5 hour and 5.0 hour.
6. The process of claim 5 in which said reaction solution is maintained within the range of about 80° and about 110° C. for a period of time between 0.5 hour and 5.0 hour.
7. The process of claim 1 in which said solvent is selected from the group consisting of amines of generalized formula

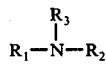

where at least one of radicals $R_1$, $R_2$ and $R_3$ is an aliphatic or an aromatic carbon network with carbon numbers of 1 to 6 with the remaining radicals, if any, being H,
aliphatic heterocyclic amines of generalized formula

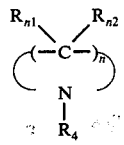

where $R_4$ is H or an aliphatic radical of carbon number of 1 to 4 and $n$ can assume values of 4 to 6 inclusive and $R_{n1}$ and $R_{n2}$ are each individually H or methyl, each of $R_{n1}$ and $R_{n2}$ being the same or different,
aromatic heterocyclic amines of generalized formula

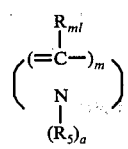

where $m$ is an integer of 4 to 6 inclusive and $a = 1$ when $m = 4$ or 6 and $a = 0$ when $m = 5$, and $R_5$ is H or aliphatic radical of carbon number 1 to 4 and $R_{m1}$ is H or methyl,
aliphatic amides of formic acid of generalized formula

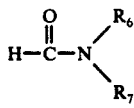

where $R_6$ and $R_7$ are each individually H or an aliphatic radical of carbon number 1 to 3, each of $R_6$ and $R_7$ being the same or different, alcohols of generalized formula

where $R_8$ is an aliphatic radical of carbon number 3 or 4, sulfides of generalized formula

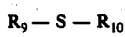

where $R_9$ and $R_{10}$ are the same or different aliphatic radicals having a carbon number of 1 to 3, aliphatic heterocyclic sulfides of generalized formula

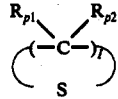

where $p$ is an integer between 4 and 6 inclusive and $R_{p1}$ and $R_{p2}$ are each individually H or methyl, each of $R_{p1}$ and $R_{p2}$ being the same or different, sulfoxides of generalized formula

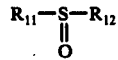

where $R_{11}$ and $R_{12}$ are aliphatic radicals of carbon number 1 to 3, aliphatic heterocyclic sulfoxides of generalized formula

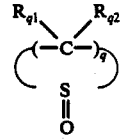

where $q$ is an integer of 4 to 6 inclusive and $R_{q1}$ and $R_{q2}$ are each individually H or methyl, each of $R_{q1}$ and $R_{q2}$ being the same or different, sulfones of generalized formula

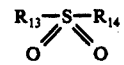

where $R_{13}$ and $R_{14}$ are aliphatic radicals of carbon 1 to 3, aliphatic heterocyclic sulfones of generalized formula

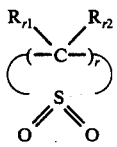

where $r$ is an integer of 4 to 6 inclusive and $R_{r1}$ and $R_{r2}$ are each individually H or methyl, each of $R_{r1}$ and $R_{r2}$ being the same or different, and mixtures thereof.

8. The process of claim 7 in which said solvent is an amine.

9. The process of claim 7 in which said solvent is an aliphatic heterocyclic amine.

10. The process of claim 7 in which said solvent is an aromatic heterocyclic amine.

11. The process of claim 7 in which said solvent is an aliphatic amide.

12. The process of claim 7 in which said solvent is an alcohol.

13. The process of claim 7 in which said solvent is a sulfide.

14. The process of claim 7 in which said solvent is an aliphatic heterocyclic sulfide.

15. The process of claim 7 in which said solvent is a sulfoxide.

16. The process of claim 7 in which said solvent is an aliphatic heterocyclic sulfoxide.

17. The process of claim 7 in which said solvent is a sulfone.

18. The process of claim 7 in which said solvent is an aliphatic heterocyclic sulfone.

19. The process of claim 1 in which said solvent is selected from the group consisting of aniline, pyridine, 2-picoline, 4-picoline, N,N-dimethylformamide, n-propylalcohol, tetrahydrothiophene, dimethylsulfoxide, tetramethylenesulfoxide, tetramethylenesulfone, and mixtures thereof.

20. The process of claim 19 in which said solvent is pyridine.

21. The process of claim 19 in which said solvent is 2-picoline.

22. The process of claim 19 in which said solvent is 4-picoline.

23. The process of claim 19 in which said solvent is N,N-dimethylformamide.

24. The process of claim 19 in which said solvent is n-propylalcohol.

25. The process of claim 19 in which said solvent is tetrahydrothiophene.

26. The process of claim 19 in which said solvent is dimethylsulfoxide.

27. The process of claim 19 in which said solvent is tetramethylenesulfoxide.

28. The process of claim 19 in which said solvent is tetramethylenesulfone.

29. The process of claim 19 in which said solvent is aniline.

* * * * *